Feb. 4, 1930.  R. L. TULLIS  1,745,879
BIRD CAGE
Filed Feb. 24, 1925  3 Sheets-Sheet 1

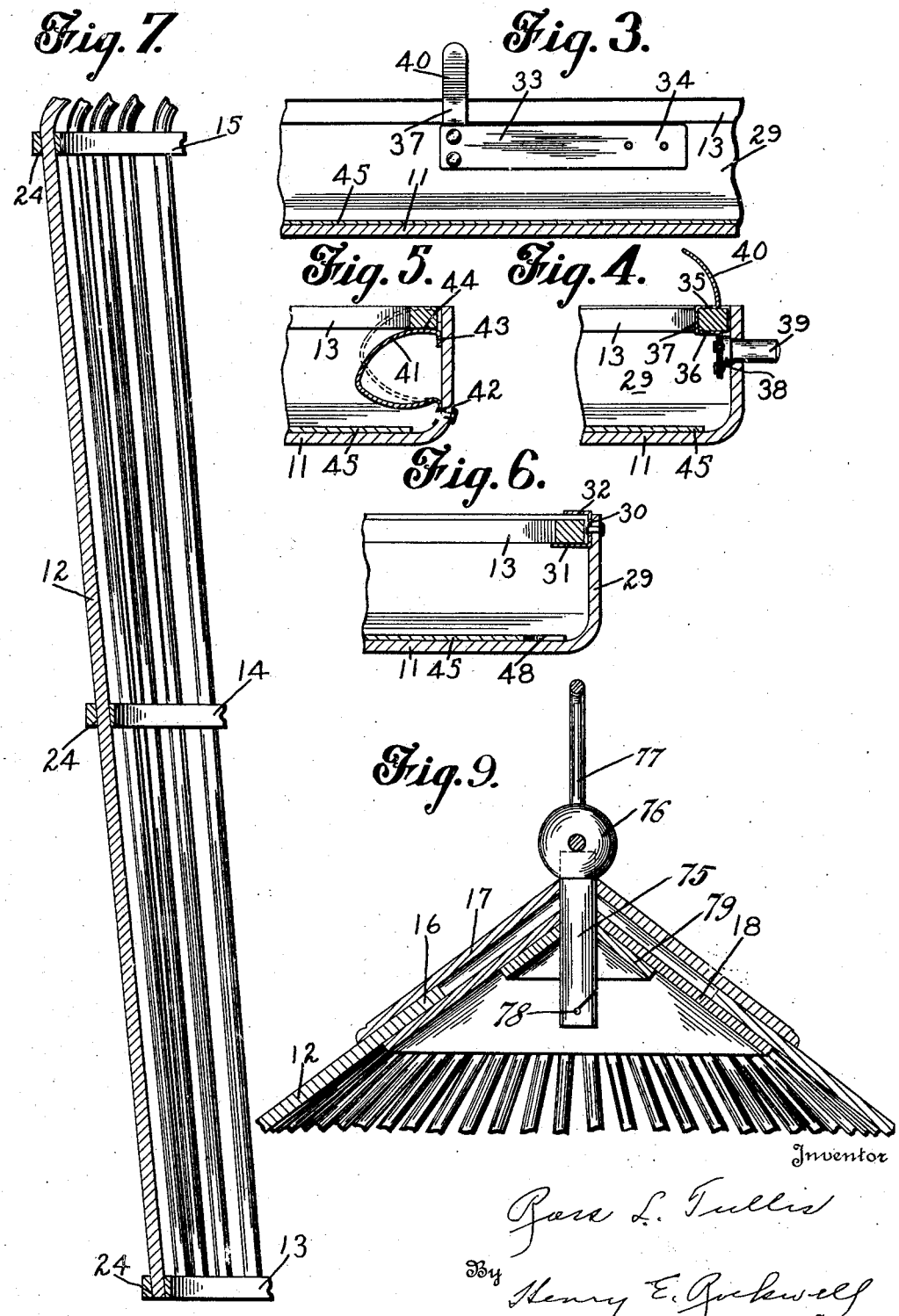

Feb. 4, 1930.  R. L. TULLIS  1,745,879
BIRD CAGE
Filed Feb. 24, 1925   3 Sheets-Sheet 3

Patented Feb. 4, 1930

1,745,879

UNITED STATES PATENT OFFICE

ROSS L. TULLIS, OF NEW HAVEN, CONNECTICUT, ASSIGNOR TO THE ANDREW B. HENDRYX COMPANY, OF NEW HAVEN, CONNECTICUT, A CORPORATION OF CONNECTICUT

BIRD CAGE

Application filed February 24, 1925. Serial No. 11,272.

This invention relates to bird cages, and more especially to ornamental cages made of such substances as pyralin, celluloid, fiberloid, or some other of the various cellulose esters. By using such material a cage may be made which is particularly pleasing in appearance, both on account of the smooth and lustrous finish which may be given it, and also on account of the contrasting colors, the use of which such construction permits.

Material of this character cannot obviously be treated in the same manner as metals, and hence in the manufacture of such cages different methods must be used in assembling and securing together the parts of which the structure is made.

However, while my improvements are shown in connection with a cage of this character, and while some features of the invention are particularly applicable thereto, it will be obvious that other features may be applied to cages of any character, and are capable of broad use and application in other relations.

One object of my invention is the provision of a bird cage made of a cellulose ester, which will be pleasing in appearance and at the same time conveniently and relatively economically manufactured.

Another object of my invention is to provide an improved means for assembling and securing together the parts of the cage, referring especially to the method of securing the upright rods or bars to the horizontal rails.

A still further object of my invention is to provide an improved means for securing the bottom or lower pan of the cage to the body portion, thereof, such that the lower pan may be readily detachable from the body of the cage and at the same time will be securely and tightly held in position so that the cage, if desired, may be used in a suspended position.

To these and other ends, the invention consists in the novel features and combination of parts to be hereinafter described and claimed.

In the accompanying drawings:

Fig. 3 is a sectional view on line 3—3 of Fig. 2, showing the catch which secures the body of the cage to the bottom portion;

Fig. 4 is a sectional view through the cage on line 4—4 of Fig. 2;

Fig. 5 is a sectional view on line 5—5 of Fig. 2, showing the spring members which assist in holding the parts rigidly together;

Fig. 6 is a sectional view on line 6—6 of Fig. 2;

Fig. 7 is an enlarged sectional view through one of the upright rods or bars;

Fig. 9 is a view similar to Fig. 8 showing a different manner of constructing the top portion of the cage.

Figure 1:
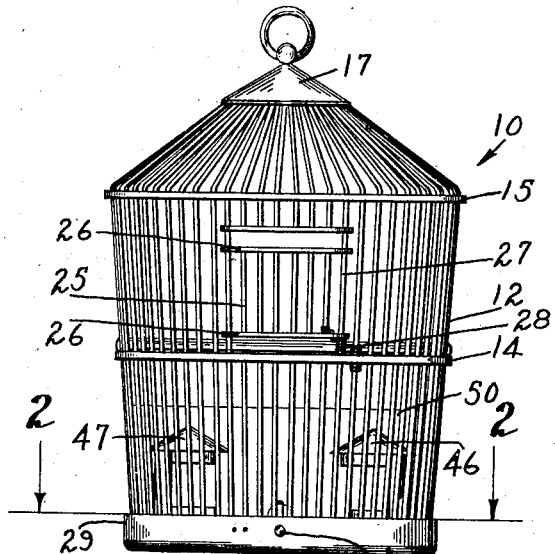
Fig. 1 is a front elevational view of a bird cage, embodying my improvements.
Figure 2:
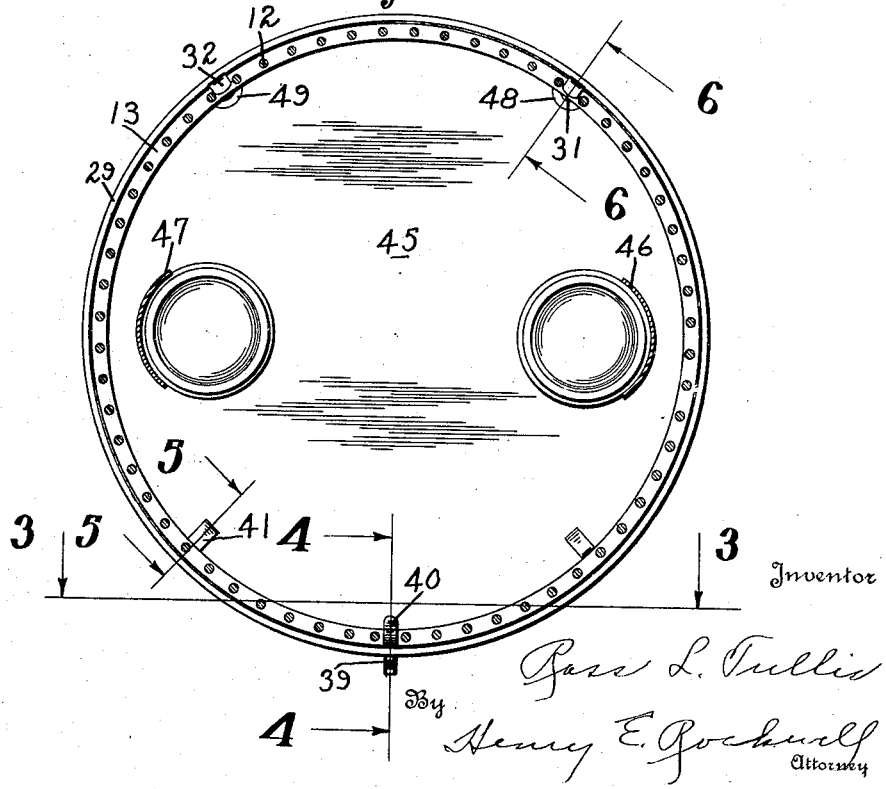
Fig. 2 is an enlarged sectional view on line 2—2 of Fig. 1.
Figure 8:
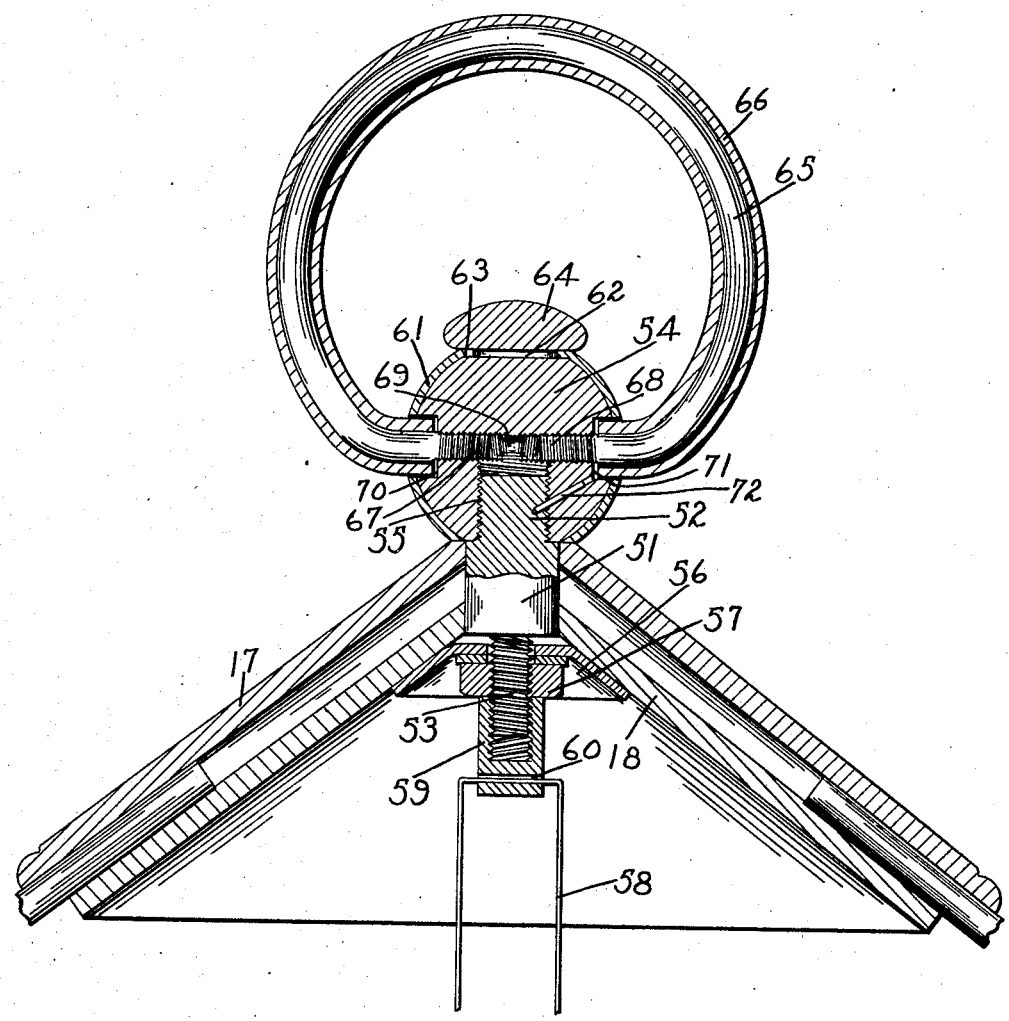
Fig. 8 is a sectional view of the upper tip and ring of the cage.

The cage which I have selected to illustrate and describe as a preferred embodiment of my invention, comprises a body portion 10 and a lower pan or bottom portion 11, which is detachably connected to the body of the cage. The entire cage is preferably made of a material such as one of the cellulose esters, which will take a very high and lustrous finish and by the use of which a very ornate and artistic cage may be made. The body 10 of the cage consists of the vertical, wire-like rods 12 and the horizontal rails 13, 14 and 15, three of such rails being shown in the drawing, but obviously the number may be varied if desired. The cage, as shown, is circular in cross section, the rods 12 preferably flaring slightly from the lower rail 13 to the upper rail 15 so that the lower portion of the cage is substantially frusto-conical in shape. Above the rail 15, the rods converge sharply in cone-shaped fashion, their ends 16, as shown in Fig. 8, being set in between two cone shaped caps 17 and 18, which caps are preferably of the same material as the rest of the cage. A suitable adhesive, such as glue, may be used to secure the ends 16 of the rods in position. The caps 17 and 18 are perforated at their apices and through these perforations is passed a metal stem 51, provided with reduced threaded ends 52 and 53. A ball 54 is provided at its lower side with a threaded opening 55 by which it may be secured to the end 52 of the stem, the lower side of the ball contacting with the upper side of the cap 17. Upon the lower threaded end 53 of the stem is slipped a dome-shaped member 56, which is secured in place by a nut 57. It will be apparent that the caps 17 and 18 are securely clamped between the lower part of the ball 54 and the washer 56 so that these two caps are held together and at the same time means are provided for securing to the cage the supporting ring by which it may be suspended. This ring is secured to the ball in a manner which may be more fully explained hereinafter. A swing 58 may be secured to the lower threaded end 53 of the stem by means of a nut 59 threaded upon the stem, the nut being perforated or slotted at 60 for the passage therethrough of the wire supporting the swing.

The rails 13, 14 and 15 are circular in shape, and as shown at 24 in Fig. 7, are perforated at intervals throughout their circumference for the passage of the rods 12. Such a construction will securely prevent the rods from being separated to such an extent that the bird might escape between them.

To secure the rails in position so as to prevent a tendency which they might have to slide longitudinally upon the rods, I apply a suitable solvent to the contiguous surfaces of these elements, which solvent tends to fuse the rails and rods together by dissolving the material and causing a firm union to be made between the two parts when the dissolved portions harden. Such a solvent is well known in the art, and the manner of its application need not be described in detail. It is, of course, possible to use a cement to cause the rods to adhere to the rails, but preferably a solvent is used as this results in a flowing together of the two parts so as to result in a one piece construction, with the parts firmly united rather than a structure wherein another element, the adhesive, is interposed between them. When the rods are passed through perforations in the rails and secured in this manner, a very firm and satisfactory construction is effected. This is especially true as regards the upper rail 15, wherein due to the shape of the cage there is a tendency for the rods to pull away from the rail if they are secured to the inner edge thereof, especially when the cage is suspended from the ring 21.

The cage is provided with a door 25, consisting of two horizontal members 26 perforated at one end to receive the bar 27. These horizontal members are connected by a number of vertical bars, and a spring 28 maintains the door normally in closed position.

The bottom 11 of the cage is provided with an upright wall 29 through which are secured fastening devices to detachably secure this member to the body 10. For this purpose there is secured to the wall 29 a number of U-shaped clips, the web portion 30 of these clips being secured flatwise against the wall 29, and the legs 31 and 32 extending inwardly toward the center of the cage. The lower rail 13 of the cage is adapted to be received within these clips between the legs thereof. Another clip of similar shape is mounted upon the free end of the leaf spring 33, the other end 34 of this spring being secured to the wall 29. This clip is disposed oppositely to the clips which are fixed to the wall, the legs 35 and 36 thereof projecting outwardly from the web portion 37. From the leg 36 depends a tongue 38, which abuts the spring and is secured flatwise thereto. A push button 39 projects through an opening in the wall 29 and is secured to the tongue member 38, so that the latter may be manipulated when the bottom of the cage is detached from the body thereof. A guiding cam 40 is arranged at the upper side of the clip so that the rail 13 may be properly guided to position within the U-shaped portion thereof.

To prevent any looseness or rattling between the parts I have provided bowed spring members 41, secured at one end 42 to the bottom of the cage. The free ends 43 of these members are turned downwardly to abut the wall 29 and slide freely in a vertical direction along this wall. The rail 13 is adapted to rest against the top portion 44 of this spring, and when the parts are assembled, the spring is slightly compressed by the rail as indicated in full and dotted line positions in Fig. 5. It will be apparent that when the parts are in the position shown in full lines in this figure, these springs will tend to expand and urge the rail 13 upwardly into engagement with the upper legs of the U-shaped securing clips.

The springs 41 also assist in detaching the bottom portion of the cage from the body, for when the button 39 is pushed inwardly, the springs immediately cause the bottom portion of the cage to be separated from the lower rail to a sufficient extent that although the button may be released immediately there is no danger of the clip secured thereto returning to its original position wherein it embraces the rail. This prevents any binding of the parts and any tendency of the bottom portion of the cage to cling to the body.

Within the bottom portion of the cage is provided a tray 45, to which is secured the food or water holders 46 and 47. This tray is removable and is provided with recesses 48 and 49 to clear the clips secured to the wall 29.

When it is desired to assemble the parts, the bottom of the cage is tipped to a slightly inclined position and the clips secured to the wall 29 are hooked over the lower rail. The bottom may then be pressed upwardly and the rail at the side opposite the fixed clips will be guided by the cam 40 into the spring clip which is allowed to give under tension of the spring 33 to clear the rail. The push button may, of course, be depressed at this time, to relieve the strain upon the rail, if desired.

A shield 50 may be provided, if desired, about the lower portion of the cage body to prevent food from being thrown between the bars of the cage by the bird. This shield is preferably of celluloid or transparent material and is arranged within and closely abutting the bars of the cage.

The ball 54 is preferably constructed of a non-corrosive metal such as brass, and in order that it will harmonize with the rest of the cage this ball is provided with a covering 61 of pyralin or the cellulose ester substance of which the cage is constructed. This is accomplished by placing the ball within a short tube of this substance. The ends of the tube are then heated to render it plastic, and these ends are, while in the plastic condition, drawn over the curved surface of the ball so that the casing conforms closely thereto. The ball is, preferably, slightly flattened at its upper pole 62, and the extreme ends of the tube are flattened over this surface, as shown at 63. The covering of pyralin being of tube form, it will be seen that a part of the flat surface 62 will be left bare to be covered by a cap 64 of pyralin secured to the upper flat part 63 of the covering.

The ring preferably consists of a metallic inner portion 65 covered by a tube 66 of pyralin or one of the cellulose esters. The ends of the ring 65 project from the covering and are threaded, as shown at 67 and 68, with right and left hand threads respectively. The ball 54 is provided with a horizontal bore 69, the ends of this bore being correspondingly threaded to receive the threaded ends of the ring. The bore 69 is counter-bored, as shown at 70 and 71, adjacent its ends so that the ends of the covering 66 are received in the counter-bores, the joints being effectually hidden in this manner. It will be seen, therefore, that the ball and ring have the appearance of being constructed of the cellulose ester composition of which the cage is made and, therefore, harmonize with the rest of the cage. A pin 72 may be inserted through one of the counter-bores 71 into the stem 51 to prevent the ball 54 from becoming detached. It will be obvious that the ball and ring may be separately formed in the manner described, and thereafter the ends of the ring may, due to the nature of the threads thereon, be threaded into the bore of the ball so that a rigid and secure connection is made.

In Figure 9 of the drawings I have shown a somewhat different construction for the upper portion of the cage. As shown in this figure the ends 16 of the vertical rods are brought together between upper caps 17 and 18, as previously described. These caps are provided with openings at their apices and through these openings is passed the stem 75 of a ball or dome 76 to which is secured a ring 77 by which the cage may be suspended. The stem 75 projects into the cage and is there provided with a slot 78 for the suspension of a swing or the like. Surrounding this stem, below the inner cap 18, is a conical washer 79 to assist in securing the parts together. All of the foregoing parts are made of a cellulose ester the same as the rails of the cage and may be secured together by a suitable adhesive.

While I have shown and described a preferred embodiment of my invention, it will be understood that it is not to be limited to all the details shown, but is capable of modification and variation within the spirit of the invention and within the scope of the appended claims.

What I claim is:

1. A bird cage comprising a body portion having a rail at the lower part thereof, a bottom portion for the cage having elements secured thereto to project over said rail, an additional element adapted to project over said rail, said element being movably secured within the cage bottom and adapted to move outwardly to engage over the rail.

2. A bird cage comprising a body portion having a rail at the lower part thereof, a bottom portion for the cage having elements secured thereto to project over said rail, an additional element adapted to project over said rail, said element being movably secured within the cage bottom and adapted to move outwardly to engage over the rail and manually engageable means to manipulate said element.

3. A bird cage comprising a body portion having a rail adjacent the lower end thereof, a bottom portion having elements fixed thereto to engage over the said rail, and a U-shaped clip movably mounted within the bottom portion of the cage and adapted to engage another portion of the rail.

4. A bird cage comprising a body portion having a rail adjacent the lower end thereof, a bottom portion having elements fixed thereto to engage over the said rail, and a U-shaped clip movably mounted within the bottom portion of the cage and adapted to engage another portion of the rail, and spring means to urge said clip to engaging position.

5. A bird cage comprising a body portion having a rail adjacent the lower end thereof, a bottom portion having elements fixed thereto to engage over the said rail, and a U-shaped clip movably mounted within the bottom portion of the cage and adapted to engage another portion of the rail, and means projecting from the exterior of the cage to manipulate said clip.

6. A bird cage comprising a body portion having a rail adjacent the lower end thereof, a bottom portion having elements fixed thereto to engage over the said rail, a spring secured within the bottom portion of the cage, and said spring carrying a U-shaped clip to engage the rail, and means projecting from the cage and adapted for manual engagement to operate said clip.

7. A bird cage comprising a body portion having a rail adjacent the lower end thereof, a bottom portion having elements fixed thereto to engage over the said rail, a spring secured to the bottom portion of the cage, said spring carrying a U-shaped clip to engage the rail, and resilient means to urge the parts into close engagement with each other.

8. A bird cage comprising a body portion and a bottom, means to detachably secure the said parts of the cage together, and spring means reacting between the bottom portion and a part of the body of the cage, normally acting in a direction to separate the parts.

9. A bird cage comprising a body portion and a bottom portion, means for detachably securing said parts together, and spring means reacting between said body and bottom portions to normally urge said securing means into tight engagement therewith.

10. A bird cage having a body portion comprising horizontal rails and uprightly disposed rods secured thereto, said rods converging above the upper rail, a tip portion to which the ends of the rods are secured, a ring for suspending the cage, and means for securing the ring to said tip portion, comprising a member secured to the cage and having sockets therein provided with right and left hand threads, and the ends of said ring being similarly threaded for reception in said sockets.

11. A bird cage having a body portion comprising horizontal rails and uprightly disposed rods secured thereto, said rods converging above the upper rail, a tip portion to which the ends of the rods are secured, a ring for suspending the cage, and means for securing the ring to said tip portion, comprising a ball secured to the cage and having sockets therein provided with right and left hand threads, and the ends of said ring being similarly threaded for reception in said sockets, said ball and ring being covered with casings of a cellulose ester substance, the sockets of said ball being counter-bored, and the ends of the ring covering being received in said counter-bores.

12. A bird cage having a body portion comprising circular horizontal rails and uprightly disposed rods, and a tip portion to which the upper ends of the rods are secured, a stem passing through the apex of the tip portion and having threaded ends, a ball secured upon the upper end of the stem, a nut secured upon the lower end of the stem below the surface of the tip whereby the latter is clamped between the ball and nut, means for securing a swing to the stem, comprising a second nut threaded upon the lower end thereof below the first nut and serving as a lock-nut for the latter, and means for securing the swing to said second nut.

In witness whereof, I have hereunto set my hand this 18th day of February, 1925.

ROSS L. TULLIS.